United States Patent
Schleiermacher et al.

(10) Patent No.: US 8,042,864 B2
(45) Date of Patent: Oct. 25, 2011

(54) ROOF MODULE FOR A MOTOR VEHICLE

(75) Inventors: Stephan Schleiermacher, Pulheim (DE); Klaus Franken, Gladbach (DE); Karsten Müller, Leverkusen (DE); Hans-Juergen Liebig, Leverkusen (DE); Detlef Mies, Elsdorf (DE); Dirk Legler, Weil (DE); Jan Woköck, Bad Aibling (DE); Frank Kiesewetter, Germering (DE); Michael Kölbl, Neuried (DE); Thomas Stemmer, München (DE)

(73) Assignee: Bayer MaterialScience AG, Leverkusen (DE)

( * ) Notice: Subject to any disclaimer, the term of this patent is extended or adjusted under 35 U.S.C. 154(b) by 266 days.

(21) Appl. No.: 12/237,451

(22) Filed: Sep. 25, 2008

(65) Prior Publication Data
US 2009/0146463 A1     Jun. 11, 2009

(30) Foreign Application Priority Data
Sep. 26, 2007 (DE) .......................... 10 2007 046 187

(51) Int. Cl.
*B60J 7/00* (2006.01)
(52) U.S. Cl. ........................................ 296/210
(58) Field of Classification Search .............. 296/210, 296/191; 29/897.2
See application file for complete search history.

(56) References Cited

U.S. PATENT DOCUMENTS

| | | | |
|---|---|---|---|
| 2,834,748 | A | 5/1958 | Bailey et al. |
| 2,917,480 | A | 12/1959 | Bailey et al. |
| 3,001,973 | A | 9/1961 | Pipenbrink et al. |
| 3,120,502 | A | 2/1964 | Merten |
| 3,124,605 | A | 3/1964 | Wagner |
| 3,152,162 | A | 10/1964 | Fischer et al. |
| 3,201,372 | A | 8/1965 | Wagner |
| 3,277,138 | A | 10/1966 | Holtschmidt et al. |
| 3,394,164 | A | 7/1968 | McClellan et al. |
| 3,454,606 | A | 7/1969 | Brotherton et al. |
| 3,455,883 | A | 7/1969 | Kamal et al. |
| 3,492,301 | A | 1/1970 | Herweh et al. |
| 3,513,491 | A | 5/1970 | Gordon |
| 3,517,039 | A | 6/1970 | Wagner et al. |
| 3,567,763 | A | 3/1971 | Emmons et al. |
| 3,629,308 | A | 12/1971 | Bailey et al. |
| 3,644,457 | A | 2/1972 | König et al. |
| 3,654,106 | A | 4/1972 | Wagner et al. |
| 3,738,947 | A | 6/1973 | Fishbein et al. |
| 3,769,318 | A | 10/1973 | Windemuth et al. |
| 3,832,311 | A | 8/1974 | Windemuth et al. |
| 4,088,665 | A | 5/1978 | Findeisen et al. |
| 4,096,162 | A | 6/1978 | Windemuth et al. |
| 4,294,719 | A | 10/1981 | Wagner et al. |
| 4,344,855 | A | 8/1982 | Schäfer et al. |
| 5,509,247 | A * | 4/1996 | Fortez et al. .................. 52/630 |
| 6,499,797 | B1 | 12/2002 | Böhm et al. |
| 7,128,365 | B2 * | 10/2006 | Kiesewetter et al. ......... 296/191 |

FOREIGN PATENT DOCUMENTS

| | | |
|---|---|---|
| BE | 752261 | 12/1970 |
| BE | 761626 | 6/1971 |
| DE | 1022789 | 1/1958 |
| DE | 1027394 | 4/1958 |

(Continued)

*Primary Examiner* — Joseph Pape
(74) *Attorney, Agent, or Firm* — Connolly Bove Lodge & Hutz LLP

(57) ABSTRACT

A roof module for motor vehicles is disclosed having an exterior skin, a material layer adjacent thereto, a spacer layer, and a circumferential plastic material.

18 Claims, 1 Drawing Sheet

FOREIGN PATENT DOCUMENTS

| | | |
|---|---|---|
| DE | 1222067 | 8/1966 |
| DE | 1230778 | 12/1966 |
| DE | 1231688 | 1/1967 |
| DE | 1929034 | 12/1970 |
| DE | 2044048 | 12/1970 |
| DE | 2504400 A1 | 8/1976 |
| DE | 2537685 A1 | 3/1977 |
| DE | 2552350 A1 | 5/1977 |
| DE | 2558523 A1 | 7/1977 |
| DE | 10057365 A1 | 5/2002 |
| DE | 102 21 582 B4 | 12/2003 |
| DE | 102 36 736 B4 | 3/2004 |
| DE | 10244287 A1 | 4/2004 |
| EP | 0995667 A1 | 4/2000 |
| EP | 1077225 A2 | 2/2001 |
| GB | 843841 | 8/1960 |
| GB | 848671 | 9/1960 |
| GB | 874430 | 8/1961 |
| GB | 889050 | 2/1962 |
| GB | 994890 A | 6/1965 |
| GB | 1072956 | 6/1967 |
| GB | 1086404 | 10/1967 |
| GB | 1091949 | 11/1967 |
| GB | 1267011 | 3/1972 |
| GB | 1303201 | 1/1973 |
| GB | 1303202 | 1/1973 |
| NL | 7102524 | 8/1971 |
| WO | WO-2006/009939 A2 | 1/2006 |
| WO | WO 2006/099939 A1 | 9/2006 |

* cited by examiner

ROOF MODULE FOR A MOTOR VEHICLE

1. PRIORITY

Priority is claimed to German Patent Application No. 10 2007 046 187.0, filed Sep. 26, 2007. The aforementioned priority document is incorporated herein by reference in its entirety

BACKGROUND OF THE INVENTION

1. Field of the Invention

The field of the present invention relates to a multi-layered roof module for motor vehicles.

2. Background

EP-A-995 667 and EP-A-1 077 225 describe the preparation of automobile exterior components, such as roof modules, engine hoods etc., wherein deep-drawn colorized thermoplastic sheets or metal foils are reinforced by glass-fiber reinforced polyurethane (PUR). DE-A-100 57 365 describes the preparation of fiber-reinforced plastic sandwich components having an intermediate layer structure.

The deep-drawn sheets usually do not run exactly according to the contour of the mold. This produces an air cushion between the sheet and mold. When a full-surface glass fiber (GF) PUR is introduced, the entrapped air cannot escape from between the sheet and mold during the PUR foaming. The thus entrapped air is partially compressed; the foaming pressure is lower than the pressure of the air between the sheet and mold, resulting in a bulging of the sheet towards the GF PUR. This indentation remains visible on the sheet surface after the molded part has been demolded.

The deep-drawn sheets from thermoplast, aluminum coil coasting or steel coil coating may also be reinforced by another process. In this method, the sheets are inserted in the foaming mold and covered by a layer of GF PUR in a long fiber injection (LFI) PUR method. A honeycomb cardboard is inserted in the reaction mixture while it is still wet. (The honeycomb cardboard may be coated with a glass-fiber mat on both sides thereof. The honeycomb cardboard serves the function of a spacer in the component. This results in a weight reduction as compared to the conventional LFI PUR method.) Now, a second layer of GF PUR is inserted onto the honeycomb cardboard by the LFI PUR method. Subsequently, the mold is closed, and the honeycomb cardboard with the LFI PUR is formed into the desired shape.

For example, a honeycomb cardboard having a thickness of 12 mm is compressed to about 7 mm in the middle zone and about 2 mm in the marginal zone. Due to the high degree of compression in the marginal zone, the air present between the sheet and foaming mold becomes entrapped and cannot escape during the foaming process. This produces partial air cushions that result in the formation of indentations in the sheet.

In addition, it is difficult in this method to foam thread inserts or metal sheet inserts with screwing points in a way as to achieve high tearing-out forces.

In this construction, the trimming edge of the built-in component projects into the wet zone of the vehicle. Due to the capillary action and hydrophilicity of the honeycomb cardboard, an undesirable water absorption by the component may occur. The wet honeycomb may be attacked by microbes, and/or the component may freeze and burst open at freezing temperatures (ice bursting), resulting in a delamination of the exterior coating and reinforcement. In the worst case, this may lead to a drastic deterioration of the mechanical properties.

DE 102 44 287 A1 describes a process for the preparation of a composite element composed of i) a sheet and ii) a reinforcing layer containing a polyurethane, comprising the steps of: (A) inserting a sheet (i) in an open mold, B1) introducing polyurethane system components into the mold on top of the sheet (i), B2) introducing a spacer layer into the mold on top of the introduced polyurethane system components, B3) introducing polyurethane system components into the mold on top of the inserted spacer layer, and C) closing the mold and reacting the introduced polyurethane system components to form a polyurethane (ii), and D) optionally trimming projecting sheet, wherein the dimensions of the spacer layer are selected in such a way that the outer edge of the spacer layer within the composite element has a distance of at least from 10 mm to 300 mm, preferably from 15 to 250 mm, more preferably from 25 to 220 mm, more preferably from 40 to 200 mm, from the edge of the resulting composite element. Further, this specification relates to a composite element composed of i) a sheet and ii) a reinforcing layer containing a polyurethane, wherein a spacer layer is embedded in the reinforcing layer, characterized in that the embedded spacer layer has a horizontal distance of at least from 10 mm to 300 mm, preferably from 15 to 250 mm, more preferably from 25 to 220 mm, more preferably from 40 to 200 mm, from the edge of the composite element, and to the use of the composite element for preparing indentation-free vehicle body exterior parts, especially indentation-free roof modules.

"Indentation-free" within the meaning of DE 102 44 287 A1 means that no unevenness, especially no projections or indentations, can be detected in sheet (i) upon visual inspection of the prepared composite element, i.e., the sheet is in a planar arrangement on the reinforcing layer. However, according to the technical teaching disclosed therein, surfaces having a high optical finish (class A) cannot be prepared.

WO 2006/09939 A1 relates to a process for the preparation of fiber-reinforced composite components in which an exterior sheet is bonded to a layer containing fiber-reinforced polyurethane, characterized in that a) an elastic intermediate layer having a modulus of elasticity of from 0.5 MPa to 50 MPa and a thickness of from 0.3 mm to 6 mm is first applied to the outer sheet having a thickness within a range of from 0.2 mm to 5 mm; and subsequently b) at least one other layer is applied to the back side of the intermediate layer, wherein at least one layer containing fiber-reinforced polyurethane is applied.

SUMMARY OF THE INVENTION

The present invention is directed toward a roof module for motor vehicles. The roof module includes an exterior skin, a material layer adjacent to the exterior skin along its full surface, and a spacer layer adjacent to the material layer. The material layer has a thermal expansion coefficient that is different from that of the exterior skin and is selected to essentially avoid deformation of the composite upon a temperature change within a range of from −20° C. to +80° C. The spacer layer comprises a core material covered by a fiber-reinforced polyurethane layer on one or both major surfaces thereof. The circumference of the material layer is free from the spacer layer on the side facing away from the exterior skin, thereby defining a circumferential zone that is covered by a fiber-reinforced plastic material.

FIG. 1 shows schematically a roof module according to the present application.

Accordingly, an improved roof module for motor vehicles is disclosed. Advantages of the improvements will appear from the drawings and the description of the preferred embodiment.

BRIEF DESCRIPTION OF THE DRAWING

The figure illustrates the different layers of a roof module in partial cross section.

DETAILED DESCRIPTION OF THE PREFERRED EMBODIMENTS

Figure 1:
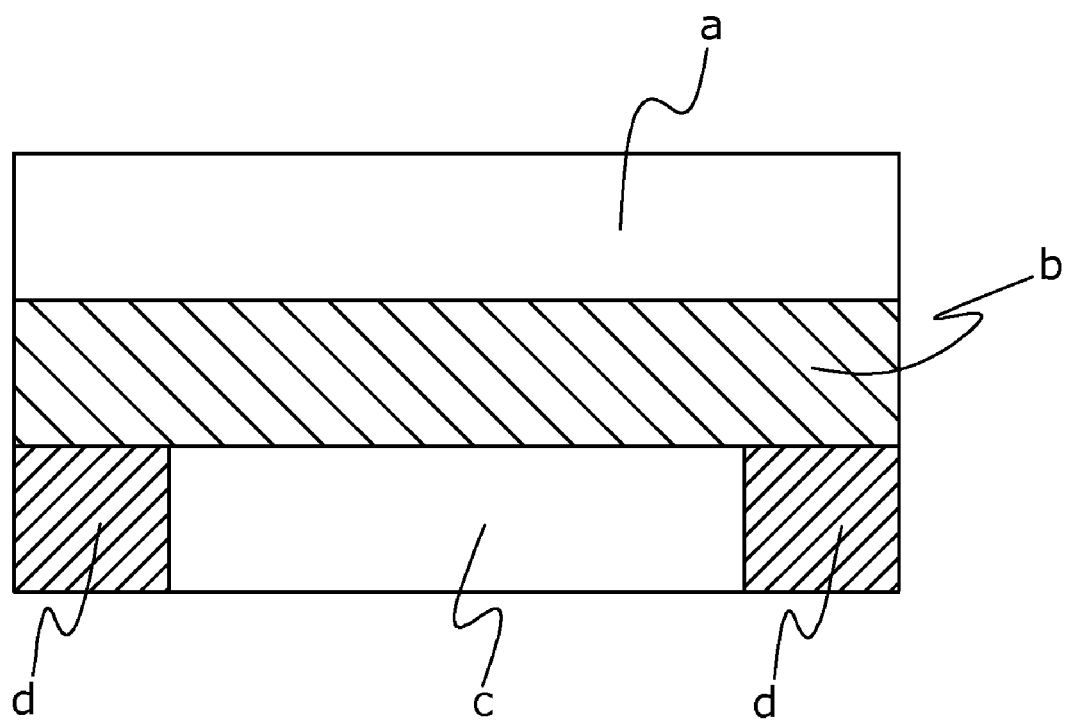

A roof module for a motor vehicle, shown in FIG. 1, includes an exterior skin, a material layer (b) adjacent to the exterior skin (a) along its full surface, and a spacer layer (c) adjacent to the material layer (b). The material layer (b) has a thermal expansion coefficient different from that of the exterior skin (a). Further, the material layer (b) is preferably selected to essentially avoid deformation of the composite upon temperature changes in the range of −20° C. to +80° C. The spacer layer (c) includes a core material covered by a fiber-reinforced polyurethane layer on at least one of its major surfaces. The spacer layer (c) does not entirely cover the material layer (b), leaving a circumferential zone free about the perimeter of the material layer (b). This circumferential zone (d) is covered by a fiber-reinforced plastic material.

For the exterior skin (a), generally known sheets, especially thermoplastic sheets, can be employed, for example, usual sheets based on acrylonitrile-butadiene-styrene (ABS), poly(methyl methacrylate) (PMMA), acrylonitrile-styrene-acrylate ester (ASA), polycarbonate (PC), thermoplastic polyurethane, polypropylene, polyethylene and/or polyvinyl chloride (PVC). Preferably, a two-layer sheet is used as the thermoplastic exterior skin (a), wherein the first layer is based on PMMA and the second layer is based on ASA and/or PC. If a two-layer sheet is employed, the polyisocyanate polyaddition products are preferably adhered to ASA and/or ASA/PC.

In addition, for the exterior skin (a), all the usual metal foils may be used, and an aluminum foil or steel foil, especially a so-called aluminum coil coating, is preferably employed.

Such exterior skins (a) are commercially available, and their preparation is generally known. The above mentioned sheets generally have a thickness of from 0.2 to 5 mm, preferably from 0.5 to 1.5 mm.

For example, coextruded sheets comprising a spacer layer of polycarbonate or ABS (acrylonitrile-butadiene-styrene) and a surface layer of PMMA (poly(methyl methacrylate)) are employed as outer exterior skins (a). However, monosheets of ABS are also possible. They preferably have a modulus of elasticity of above 800 MPa, preferably from 1000 MPa to 100,000 MPa, so that their intrinsic stiffness provides a basic stability that acts against the forces which the material layer (b) may exert due to an elastic deformation.

Alternatively to the above mentioned exterior skins (a), these may also include so-called in-mold coatings or gel coatings. In-mold coating is a method by which the paint coating of a plastic molded part is performed within the mold already. Thus, a highly reactive two-component paint is placed into the mold by means of a suitable painting technique. Thereafter, the polyurethane-based material layer (b) is introduced in the open or closed mold to result in a component (roof module in this case) having a surface finish that may be high gloss to matte and textured depending on the nature of the mold.

Due to the similarity in chemical nature between the in-mold coating layer (exterior skin (a)) and the material layer (b) as well as the fact that the two components of the roof module are combined within a short period of time, there is a strong chemical and mechanical bonding at the interface (adhesive bond). Repair and overpainting are possible even after the curing of the IMC layer.

The in-mold coating is
highly reactive (dust dry after 3 minutes);
free of solvent according to the VOC guideline;
variable in hue and final rigidity;
free of chromate and lead;
UV-stable; and
resistant to chemicals.

The in-mold coating technique involves the following advantages:
Cost reduction because of shortening or omission of individual process steps.
Strong adhesion between the surface of the molded part and the paint coat.
The quality of the paint surface can be matched to the client's desires by selecting the nature of the mold.
Greater freedom of design in the forming of the molded part.
Possible adaptation of the system to a wide variety of base materials and procedures.
The method is ideally suitable for the use of fillers, such as ground glass fibers and sisal.
There is a considerable potential in the realization of very short reaction and process times.

In this case of in-mold coating, the thickness of the exterior skin (a) is from 10 to 100 μm.

In the case of gel coating, the thickness of the exterior skin (a) is from 0.2 mm to 1.5 mm.

The exterior skin (a) is adjacent to the full surface of material layer (b), whose thermal expansion coefficient is different from that of exterior skin (a) and is selected to essentially avoid deformation of the composite upon a temperature change within a range of from −20° C. to +80° C.

The function of the material layer (b) is to absorb the stress resulting from the different expansion behavior of exterior skin (a) and the spacer layer (c) in such a way that the mechanical strength of the roof module on the one hand and the high optical quality of exterior skin (a) on the other are permanently retained even upon mechanical and thermal alternating stress.

In particular, the material layer (b) must also be able to reliably buffer the unevenness formed at the surface of the spacer layer (c) from the different shrinkage properties of the fibers and the polymer matrix.

In addition, material layer (b) is expected to prevent the roof module from bending due to the different shrinkage properties of exterior skin (a) and the spacer layer (c) or, for example, to prevent the fiber structures of the spacer layer (c) from indenting the surface of exterior skin (a), for example, due to the fact that the fibers always have a somewhat inhomogeneous distribution. In addition, the material layer (b) should be capable of absorbing surface defects due to entrapped air in the fiber-reinforced spacer layer (c), which manifest themselves upon thermal alternating stress among others, in order to achieve a good optical appearance (class A surface finish).

Another function of the material layer (b) is to avoid surface defects from frozen interior stresses that may result from the preparation process or downstream forming processes, for example, when thermoplastic exterior skins (a) are used. Such interior stresses may result in a so-called memory effect in the further processing into the finished roof module, for example, due to elevated temperatures, which effect causes local shrinkage. Consequently, the material layer (b) must be capable of absorbing the resulting displacements so that surface defects do not occur. In this case, thermoplastic exterior skins (a) of lower quality could also be used.

The material layer (b) separates, not only the spacer layer (c) from the exterior skin (a), but also the circumferential zone with fiber-reinforced plastic material (d), so that vibrations from the interior of the motor vehicle are directed to the outer surface of exterior skin (a) of the roof module to a low extent.

The material layer (b) has such a design that the maximum stresses in the interfaces due to the different dimensional changes due to thermal shrinkage upon cooling and/or the reaction shrinkage as well as the expansion of entrapped air and the local dimensional changes in the exterior skin (a) due to the memory effect are so low that the intrinsic stiffness of the exterior skin (a) ensures that a class A surface finish can be formed. In addition, the stresses are so low that local delaminations can occur neither at the interface between the exterior skin (a) and the material layer (b) nor at the interface between the spacer layer (c) and the material layer (b). Therefore, the material layer (b) has a modulus of elasticity, in particular, of from 0.5 MPa to 50 MPa, preferably from 1 MPa to 10 MPa and more preferably from 2 MPa to 5 MPa.

In addition, the material layer (b) must not be too thin, because otherwise even very elastic materials can no longer sufficiently absorb the stresses. However, it should not be too thick either, because otherwise the hydrostatic stiffening is no longer sufficiently effective, and the whole composite might become too flexible. Thus, there is an optimum thickness of the material layer (b). Therefore, the material layer (b) has a thickness of from 0.3 mm to 6 mm, preferably from 1 mm to 4 mm, more preferably from 1.5 mm to 3 mm.

It is also possible to employ for material layer (b) a viscoelastic material that is capable of absorbing stresses and nevertheless has sufficient strength to bond the layers together permanently.

When a very elastic material layer (b) with the described low values of the modulus of elasticity is used, there is a risk that the outer exterior skin (a) may be detectably indented at points under high local stresses (undesirable soft touch effect) or may even be overstretched. This risk exists, in particular, if the material layer (b) possibly allows a detectable indentation of the outer exterior skin (a) due to its compressibility before the stiffness of the spacer layer (c) can exert its effect.

Therefore, it is important for the material layer (b) to consists of a material that is as incompressible as possible, for when the outer exterior skin (a) is locally indented, the incompressible material layer (b) must be displaced, which creates additional hydrostatic stiffness. This material behavior is described by the bulk modulus of material layer (b), which should be, in particular, from 500 MPa to 5000 MPa, preferably from about 1000 MPa to 2500 MPa, even more preferably from about 1200 MPa to 2000 MPa.

To produce a thin and uniform material layer (b), it is preferably applied by spraying to the outer exterior skin (a) contained in a mold. It has been found that the properties of material layer (b) can have their optimum effect if the spray application achieves a uniform mass distribution with preferably less than ±10% deviation, more preferably less than ±5% deviation, of the mass of material layer (b), based of area elements of 5 cm², i.e., that the weights of material layer (b) of any two area elements will deviate by less than ±10% or ±5%.

In the case of a combination of an outer exterior skin (a) prepared by the in-mold coating method, material layer (b) serves a different function. In this case, a high elasticity is rather disadvantageous. However, its function is, in particular, to keep glass fibers and other sources of unevenness in deeper layers of the material, especially the spacer layer (c), at a distance from the outer exterior skin (a) in order that a class A surface finish can be achieved. Accordingly, the material layer (b) should be a substrate for the paint coating that is as rigid as possible, as well as a moisture barrier.

To improve the adhesion between the material layer (b) and the subsequently applied spacer layer (c), it has been found advantageous if the application of spacer layer (c) is effected before the complete curing time of material layer (b) expires.

For example, material layer (b) is obtainable by reacting:
a) organic di- and/or polyisocyanates with
b) at least one polyether polyol having a number average molecular mass of from 800 g/mol to 25,000 g/mol, preferably from 800 to 14,000 g/mol, more preferably from 1000 to 8000 g/mol, and an average functionality of from 2.4 to 8, more preferably from 2.5 to 3.5; and
c) optionally further polyether polyols which are different from b) and have a number average molecular mass of from 800 g/mol to 25,000 g/mol, preferably from 800 to 14,000 g/mol, more preferably from 1000 to 8000 g/mol, and average functionalities of from 1.6 to 2.4, preferably from 1.8 to 2.4; and
d) optionally polymer polyols having contents of from 1 to 50% by weight of fillers, based on the polymer polyol, and OH numbers of from 10 to 149 and average functionalities of from 1.8 to 8, preferably from 1.8 to 3.5; and
e) optionally chain extenders having average functionalities of from 1.8 to 2.1, preferably 2, and molecular masses of 750 g/mol and lower, preferably from 18 g/mol to 400 g/mol, more preferably from 60 g/mol to 300 g/mol, and/or cross-linking agents having average functionalities of from 3 to 4, preferably 3, and molecular masses of up to 750 g/mol, preferably 18 g/mol to 400 g/mol, more preferably from 30 g/mol to 300 g/mol;
f) in the presence of amine catalysts and
g) metal catalysts and
h) optionally additives.

Preferably, polyurethane elastomers (PUR elastomers) which are contained in material layer (b) or from which material layer (b) consists are prepared by the prepolymer method, wherein a polyaddition adduct having isocyanate groups is conveniently prepared in the first step from at least part of the polyether polyol b) or a mixture thereof with polyol component c) and/or d) an at least one di- or polyisocyanate a). In the second step, solid PUR elastomers can be prepared from such prepolymers containing isocyanate groups by reacting them with low-molecular weight chain extenders and/or cross-linking agents e) and/or the rest of polyol components b) and optionally c) and/or d). If water or other blowing agents or mixtures thereof are included in the second step, microcellular PUR elastomers can be prepared, wherein the bulk modulus thereof is to be from 500 to 5000 MPa.

As the starting component a), aliphatic, cycloaliphatic, araliphatic, aromatic and heterocyclic polyisocyanates as described, for example, by W. Siefken in Justus Liebigs Annalen der Chemie, 562, pages 75 to 136, are suitable. Examples thereof are those of formula

in which n=2, 3 or 4, preferably 2 or 3, more preferably 2, and Q means an aliphatic hydrocarbyl residue having from 2 to 18, preferably from 6 to 10, carbon atoms, a cycloaliphatic hydrocarbyl residue having from 4 to 15, preferably from 5 to 10, carbon atoms, an aromatic hydrocarbyl residue having from 6 to 15 carbon atoms, preferably from 6 to 13 carbon atoms, or an araliphatic hydrocarbyl residue having from 8 to 15, preferably from 8 to 13, carbon atoms. Preferred are ethylene diisocyanate, 1,4-tetramethylene diisocyanate, 1,6-hexamethylene diisocyanate (HDI), 1,12-dodecane diisocyanate, cyclobutane 1,3-diisocyanate, cyclohexane 1,3- and 1,4-diisocyanate and any mixtures of such isomers, 1-isocyanato-3,3,5-trimethyl-5-isocyanatomethylcyclohexane, 2,4- and 2,6-hexahydrotoluylene diisocyanate and any mixtures of such isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durol diisocyanate (DDI), 4,4'-stilbene diisocyanate, 3,3'-dimethyl-4,4'-biphenylene diisocyanate (TODI), 2,4- and 2,6-toluylene diisocyanate (TDI) and any mixtures of such isomers, diphenylmethane-2,4'- and/or -4,4'-diisocyanate (MDI) or naphthylene-1,5-diisocyanate (NDI).

Further, there may be used, for example: triphenylmethane 4,4'4"-triisocyanate, polyphenyl polymethylene polyisocyanate as obtained by the condensation of aniline with formaldehyde followed by phosgenization and described, for example, in GB-A 874 430 and GB-A 848 671, and p-isocyanatophenylsulfonyl isocyanates according to U.S. Pat. No. 3,454,606, perchlorinated aryl polyisocyanates as described in U.S. Pat. No. 3,277,138, carbodiimide group containing polyisocyanates as described in U.S. Pat. No. 3,152,162 and in DE-A 25 04 400, DE-A 25 37 685 and DE-A 25 52 350, norbornane diisocyanates according to U.S. Pat. No. 3,492,301, polyisocyanates having allophanate groups as described in GB-A 994 890, BE-A 761 626 and NL-A 7 102 524, polyisocyanates having isocyanurate groups as described in U.S. Pat. No. 3,001,9731, in DE-A 10 22 789, DE-A 1222 067 and DE-A 1 027 394 and in DE-A 1 929 034 and DE-A 2 004 048, polyisocyanates having urethane groups as described in BE-A 752 261 or in U.S. Pat. No. 3,394,164 and DE-A 3 644 457, polyisocyanates having acylated urea groups according to DE-A 1 230 778, polyisocyanates having biuret groups as described in U.S. Pat. No. 3,124,605, U.S. Pat. No. 3,201,372 and U.S. Pat. No. 3,124,605 and in GB-A 889 050, polyisocyanates prepared by telomerization reactions as described in U.S. Pat. No. 3,654,106, polyisocyanates having ester groups as mentioned in GB-A 965 474 and GB-A 1 072 956, in U.S. Pat. No. 3,567,763 and in DE-A 12 31 688, reaction products of the above mentioned isocyanates with acetals according to DE-A 1 072 385 and polyisocyanates containing fatty acid esters according to U.S. Pat. No. 3,455,883.

It is also possible to employ the distillation residues containing isocyanate groups as obtained in technical isocyanate production, optionally dissolved in one or more of the above mentioned polyisocyanates Further, it is possible to use any mixtures of the above mentioned polyisocyanates.

Preferably employed are 2,4- and 2,6-toluylene diisocyanate and any mixtures of such isomers ("TDI"), 4,4'-diphenylmethane diisocyanate, 2,4'-diphenylmethane diisocyanate, 2,2'-diphenylmethane diisocyanate and polyphenyl polymethylene polyisocyanates prepared by the condensation of aniline with formaldehyde followed by phosgenization ("raw MDI"), and polyisocyanates having carbodiimide groups, uretoneimine groups, urethane groups, allophanate groups, isocyanurate groups, urea groups or biuret groups ("modified polyisocyanates"), especially those modified polyisocyanates that are derived from 2,4- and/or 2,6-toluylene diisocyanate or 4,4'- and/or 2,4'-diphenylmethane diisocyanate. Also highly suitable are naphthylene 1,5-diisocyanate and mixtures of the mentioned polyisocyanates.

More preferably used in the process are prepolymers having isocyanate groups that are prepared by reacting at least a portion of polyol component b) and/or c) and/or chain extenders and/or cross-linking agents e) with at least one aromatic diisocyanate selected from the group of TDI, MDI, TODI, DIBDI, NDI, DDI, preferably with 4,4'-MDI and/or 2,4-TDI and/or 1,5-NDI to form a polyaddition product having urethane groups and isocyanate groups and having an NCO content of from 6 to 25% by weight, preferably from 8 to 20% by weight.

As set forth above, mixtures of b), c), d) and e) may be used for the preparation of the prepolymers containing isocyanate groups. According to a preferably employed embodiment, however, the prepolymers containing isocyanate groups are prepared without a chain extender or cross-linking agent e).

The prepolymers having isocyanate groups can be prepared in the presence of catalysts. However, it is also possible to prepare the prepolymers having isocyanate groups in the absence of catalysts, and to add the catalysts to the reaction mixture only when the PUR elastomers are prepared.

Suitable polyether polyols b) or c) for the preparation of the elastomers can be prepared by known methods, for example, by the polyinsertion via the DMC catalysis of alkylene oxides, by the anionic polymerization of alkylene oxides in the presence of alkali hydroxides or alkali alcoholates as catalysts and with the addition of at least one initiator molecule containing from 2 to 6, preferably from 2 to 4, reactive hydrogen atoms bound thereto, or by the cationic polymerization of alkylene oxides in the presence of Lewis acids, such as antimony pentachloride or boron fluoride etherate. Suitable alkylene oxides contain from 2 to 4 carbon atoms in the alkylene residue. Examples thereof include tetrahydrofuran, 1,2-propylene oxide, 1,2- or 2,3-butylene oxide, and preferably, ethylene oxide and/or 1,2-propylene oxide are employed. The alkylene oxides may be used singly, alternately, successively or as mixtures. Preferably, mixtures of 1,2-propylene oxide and ethylene oxide are employed, the ethylene oxide being employed in amounts of from 10 to 50% as ethylene oxide (EO) cap, so that the polyols formed have more than 70% primary OH groups. As initiator molecules, there may be used water or di- and trihydric alcohols, such as ethylene glycol, 1,2-propanediol and 1,3-propanediol, diethylene glycol, dipropylene glycol, ethanediol-1,4, glycerol, trimethyloipropane.

Suitable polyether polyols, preferably polyoxypropylene polyoxyethylene polyols, have average functionalities of from 2.4 to 8, more preferably from 2.5 to 3.5 (for polyether polyols b)), or average functionalities of from 1.6 to 2.4, preferably from 1.8 to 2.4 (for polyether polyols c)), and number average molecular masses of from 800 g/mol to 25,000 g/mol, preferably from 800 to 14,000 g/mol, more preferably from 1000 to 8000 g/mol (for polyether polyols b) and c)).

In addition to the above mentioned polyether polyols, also suitable as polymer polyols d) are polymer-modified polyether polyols, preferably graft polyether polyols, especially those based on styrene and/or acrylonitrile prepared by in situ polymerization of acrylonitrile, styrene or preferably mixtures of styrene and acrylonitrile, for example, at a weight ratio of from 90:10 to 10:90, preferably from 70:30 to 30:70, as well as polyether polyol dispersions, usually in amounts of from 1 to 50% by weight, preferably from 1 to 45% by weight, based on the polyether, that contain, for example, inorganic fillers, polyureas (PHD), polyhydrazides, polyurethanes containing tert-amino group bonded thereto and/or melamine, as a disperse phase.

Preferably, di- and trifunctional polyether polyols having a number average molecular mass of from 800 to 25,000, preferably from 800 to 14,000, g/mol, more preferably from 1000 to 8000 g/mol, are employed as components b) or c) in the preparation.

For the preparation of the elastomers, low-molecular weight difunctional chain extenders, tri- or tetrafunctional cross-linking agents or mixtures of chain extenders and cross-linking agents may be additionally employed as component e).

Such chain extenders and cross-linking agents e) are employed for modifying the mechanical properties, especially the rigidity of the PUR elastomers. Suitable chain extenders, such as alkanediols, dialkylene glycols and polyalkylene polyols, and cross-linking agents, such as tri- or tetrahydric alcohols, for example, and oligomeric polyalkylene polyols having a functionality of from 3 to 4, usually have molecular masses of <750 g/mol, preferably from 18 to 400 g/mol, more preferably from 60 to 300 g/mol. As chain extenders, there are preferably employed alkanediols with from 2 to 12, preferably 2, 4 or 6, carbon atoms, for example, ethanediol, 1,6-hexanediol, 1,7-heptanediol, 1,8-octanediol, 1,9-nonanediol, 1,10-decanediol and especially 1,4-butanediol and dialkylene glycols with 4 to 8 carbon atoms, for example, diethylene glycol and dipropylene glycol as well as polyoxyalkylene glycols. Also suitable are branched-chain and/or unsaturated alkanediols with usually not more than 12 carbon atoms, such as 1,2-propanediol, 2-methyl-1,3-propanediol, 2,2-dimethyl-1,3-propanediol, 2-butyl-2-ethyl-1, 3-propanediol, 2-butene-1,4-diol and 2-butyne-1,4-diol, diesters of terephthalic acid with glycols having from 2 to 4 carbon atoms, such as terephthalic acid bis(ethylene glycol) or terephthalic acid bis(1,4-butanediol), hydroxyalkylene ethers of hydroquinone or resorcinol, for example, 1,4-di($\beta$-hydroxyethyl)hydroquinone or 1,3-($\beta$-hydroxyethyl)resorcinol, alkanolamines with 2 to 12 carbon atoms, such as ethanolamine, 2-aminopropanol and 3-amino-2,2-dimethylpropanol, N-alkyldialkanolamines, for example, N-methyl- and N-ethyidiethanolamine, (cyclo)aliphatic diamines with 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines which may also be substituted at the aromatic nucleus with alkyl groups having from 1 to 20, preferably from 1 to 4, carbon atoms in the N-alkyl residues, such as N,N'-diethyl, N,N'-di-sec.-pentyl, N,N'-di-sec.-hexyl, N,N'-di-sec.-decyl and N,N'-dicyclohexyl, (p- or m-)phenylenediamine, N,N'-dimethyl, N,N'-diethyl, N,N'-diisopropyl, N,N'-di-sec.-butyl, N,N'-dicyclohexyl, 4,4'-diaminodiphenylmethane, N,N'-di-sec.-butylbenzidine, methylenebis(4-amino-3-benzoic acid methyl ester), 2,4-chloro-4,4'-diaminodiphenylmethane, 2,4- and 2,6-toluylenediamine.

The compounds of component e) may be employed in the form of mixtures or singly. Mixtures of chain extenders and cross-linking agents may also be employed.

To adjust the rigidity of the PUR elastomers, the constituents b), c), d) and e) may be varied in relatively broad quantitative ratios, the rigidity increasing as the content of component e) increases in the reaction mixture.

To obtain a desired rigidity of the PUR elastomer, the required amounts of constituents b), c), d) and e) can be determined experimentally in a simple way. Advantageously, from 1 to 50 weight parts, preferably from 2.5 to 20 weight parts, of the chain extender and/or cross-linking agent e) are used, based on 100 weight parts of the higher-molecular weight compounds b), c) and d).

As component f), amine catalysts familiar to the skilled person may be employed, for example, tertiary amines, such as triethylamine, tributylamine, N-methylmorpholine, N-ethylmorpholine, N,N,N',N'-tetramethylethylenediamine, pentamethyldiethylenetriamine and higher homologues (DE-A 26 24 527 and DE-A 26 24 528), 1,4-diazabicyclo[2.2.2] octane, N-methyl-N'-dimethylaminoethylpiperazine, bis (dimethylaminoalkyl)piperazine, N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-$\beta$-phenylethylamine, bis(dimethylaminopropyl)urea, bis(dimethylaminopropyl)amine, 1,2-dimethylimidazole, 2-methylimidazole, monocyclic and bicyclic amidines, bis (dialkylamino)alkyl ethers, such as bis(dimethylaminoethyl) ether, and tertiary amines having amide groups (preferably formamide groups) according to DE-A 25 23 633 and DE-A 27 32 292. Suitable catalysts also include per se known Mannich bases of secondary arhines, such as dimethylamine, and aldehydes, preferably formaldehyde, or ketones, such as acetone, methyl ethyl ketone, or cyclohexanone, and phenols, such as phenol, nonylphenol or bisphenol. Tertiary amines having hydrogen atoms reactive towards isocyanate groups as catalysts include, for example, triethanolamine, triisopropanolamine, N-methyidiethanolamine, N-ethyidiethanolamine, N,N-dimethylethanolamine, their reaction products with alkylene oxides, such as propylene oxide and/or ethylene oxide, and secondary-tertiary amines according to DE-A 27 32 292. Further, amines having carbon-silicon bonds as described in U.S. Pat. No. 3,620,984 may be employed as catalysts, for example, 2,2,4-trimethyl-2-silamorpholine and 1,3-diethylaminomethyltetramethyldisiloxane. Further, nitrogen-containing bases, such as tetraalkylammonium hydroxides, as well as hexahydrotriazines may also be used. The reaction between NCO groups and Zerewitinoff-active hydrogen atoms is also highly accelerated by lactams and azlactams.

As metal catalysts g), organometallic compounds of tin, titanium, bismuth, especially organotin compounds, may be included as additional catalysts. In addition to sulfur-containing compounds, such as di-n-octyltin mercaptide, preferably tin(II) salts of carboxylic acids, such as tin(II) acetate, tin(II) octoate, tin(II) ethylhexoate, tin(II) laurate, and tin(IV) compounds, for example, dibutyltin oxide, dibutyltin dichloride, dibutyltin diacetate, dibutyltin laurate, dibutyltin maleate or dioctyltin diacetate, may be used as organotin compounds.

The reaction mixture for the preparation of the solid and cellular PUR elastomers may optionally be provided with additives h). For example, there may be mentioned surface-active additives, such as emulsifiers, foam stabilizers, cell regulators, flame retardants, nucleating agents, oxidation retarders, stabilizers, lubricants and demolding agents, colorants, dispersing aids and pigments. As emulsifiers, there may be used, for example, the sodium salts of castor oil sulfonates or salts of fatty acids with amines, such as oleic acid diethylamine salt or stearic acid diethanolamine salt. Also, alkali or ammonium salts of sulfonic acids, such as of dodecylbenzenesulfonic acid or dinaphthylmethanedisulfonic acid, or of fatty acids, such as ricinoleic acid, or of polymeric fatty acids, may be included as surface-active additives. As foam stabilizers, there bay be used mainly polyether siloxanes, especially water-soluble ones. These compounds generally have such a structure that a copolymer of ethylene oxide and propylene oxide is attached to a polydimethylsiloxane residue. Such foam stabilizers are described, for example, in U.S. Pat.

No. 2,834,748, U.S. Pat. No. 2,917,480 and U.S. Pat. No. 3,629,308. Of particular interest are polysiloxane polyoxyalkylene copolymers multiply branched through allophanate groups according to DE-A 25 58 523. Other organopolysiloxanes, oxyethylated alkylphenols, oxyethylated fatty alcohols, paraffin oils, castor oil or ricinoleic acid ester, Turkey red oil, peanut oil and cell regulators, such as paraffins, fatty alcohols and polydimethylsiloxanes, are also suitable. For improving the emulsifying effect, the dispersion of the filler, the cell structure and/or for the stabilization thereof oligomeric polyacrylates with polyoxyalkylene and fluoroalkane residues as side groups, are further suitable. The surface-active substances are usually applied in amounts of from 0.01 to 5 parts by weight, based on 100 parts by weight of the higher-molecular weight polyhydroxy compounds b) and c). Reaction retarders as well as pigments or dyes and per se known flame retardants as well as stabilizers against ageing and weathering effects, plasticizers and fungistatically and bacteriostatically active substances may also be added.

Further Examples of surface-active additives and foam stabilizers that may optionally be included as well as cell regulators, reaction retarders, stabilizers, flame retarding substances, plasticizers, colorants and fillers as well as fungistatically and bacteriostatically active substances as well as details about the use and mode of action of these additives are described in R. Vieweg, A. Hochtlen (Editors): "Kunststoff-Handbuch", Volume VII, Carl Hanser-Verlag, Munich, 3rd Edition, 1993, pp. 118 to 124.

As the core material of the spacer layer (c), any layer that ensures a distance between two polyurethane layers is generally suitable. Preferably, the core material of the spacer layer (c) has a density which is lower than the density of a fiber-reinforced polyurethane layer or layers as such. Further, the core material of the spacer layer (c) should have such a structure that the required mechanical values of the resulting roof module are observed.

Usually, the core material of the spacer layer (c) has a thickness of from 1 mm to 20 mm, preferably from 2 mm to 15 mm, more preferably from 5 mm to 15 mm.

As the core material of the spacer layer (c), any layer ensuring a distance between two polyurethane layers is generally suitable, and thus, the core material of the spacer layer (c) may also be referred to as a separating layer. Advantageously, the core material of the spacer layer (c) should have such a construction that the stability of the resulting roof module, for example, its compression strength, is not adversely affected as compared to roof modules without a spacer layer (c). Also, it is advantageous if the spacer layer (c) has such a construction that the density of the resulting roof module is reduced as compared to roof modules without a spacer layer (c).

In a preferred embodiment, the core layer of the spacer layer (c) is selected such that the density of the resulting roof module is reduced by at least 10%, more preferably at least 15%, especially at least 20%, as compared to corresponding roof modules without a spacer layer (c). Also, in a preferred embodiment, the spacer layer (c) is selected such that the tensile strength and/or the tensile modulus and/or the flexural modulus of the resulting roof module is decreased by at most 10%, more preferably increased by at least 10%, especially increased by at least 20%, as compared to corresponding roof modules without a spacer layer (c). The physical characteristics are determined according to standards described above.

Examples of suitable core materials of spacer layers (c) are layers of expandable plastics, such as EPP, EPC, EPS, and layers of metals, such as aluminum or magnesium, or natural material layers, such as wood, cardboard or paper, as well as natural and artificial fibers. For increasing the stability, the above mentioned materials are preferably in a non-planar form, for example, in a corrugated or honeycomb form. Preferably honeycomb cardboards are used as the core material of the spacer layer (c). Preferred honeycomb layers consists of cardboard and have an average cell size of about 5 mm diameter.

In a preferred embodiment, a honeycomb cardboard layer coated with a layer of glass fibers on both sides thereof is used as the core material of the spacer layer (c). The glass fiber layer prevents components of the polyurethane system from penetrating into the individual honeycomb cardboard cells and generally has a thickness of from 0.01 mm to 2 mm, preferably from 0.1 mm to 1 mm, but has the result that the polyurethane can form a bond with the core material and thus yields a firm composite.

The core material of the spacer layer (c) contains fiber-reinforced, preferably glass-fiber reinforced, polyurethane on its major surface and serves as a support that provides the roof module with advantageous mechanical properties, such as a high strength. The term "fiber-reinforced polyurethane" as used herein means PUR containing fibers for reinforcement. The fibers may be introduced into the components of the polyurethane system, for example, by the LFI method as known from the prior art and generally have a length of more than 4 mm, preferably more than 10 mm, more preferably from 10 mm to 10 cm. Optionally, it is also possible to introduce the long fibers or continuous glass fibers in the form of mats, especially knitted, laid or non-woven mats, into the polyurethane.

The fibers employed may be glass fibers, natural fibers, such as flax, jute or sisal, artificial fibers, such as polyamide fibers, polyester fibers, carbon fibers or polyurethane fibers as well as natural fibers or metal fibers. Glass fibers are preferably used.

The fibers for reinforcement are usually employed in an amount of from 1 to 90% by weight, preferably from 5 to 70%, more preferably from 10 to 60% and even more preferably from 10 to 40%, by weight, based on the total weight of spacer layer (c).

The spacer layer (c) usually has a density of from 0.1 to 1.3 kg/l, preferably from 0.2 to 1.1 kg/l, more preferably from 0.2 to 0.8 kg/l. To achieve this density, compact or cellular polyurethanes are employed, polyurethane rigid foams being preferably used.

The thickness of the spacer layer (c) in the roof modules is usually from 0.1 to 100 mm, preferably from 0.5 to 25 mm, more preferably from 1 to 20 mm, even more preferably from 1 to 10 mm.

In the roof modules, there is preferably adhesion between the material layer (b) and the spacer layer (c), i.e., the adhesion between the layers is preferably larger than the cohesion within a layer.

The polyurethanes of the spacer layer (c) as employed may be selected from the same isocyanate components (a) or polyol components (b) as defined above for material layer (b).

Preferred are polyols (b) having a functionality of from 2 to 8, especially from 2 to 4, a hydroxyl number of from 20 to 1000 mg of KOH/g, preferably from 25 to 500 mg of KOH/g, as well as 10 to 100% primary hydroxy groups. The polyols generally have a molecular mass of from 400 to 10,000 g/mol, preferably from 600 to 6000 g/mol. Polyether polyols (b) are particularly preferred due to their higher hydrolytic stability.

In a preferred embodiment, a mixture of at least two polyether polyols (b) is used, wherein the first polyether polyol (b) has an OH number of from 20 to 50, preferably from 25 to 40, and the second polyether polyol (b) has an OH number of from 100 to 350, preferably from 180 to 300, the weight ratio of the first to second polyether polyols (b) generally being from 99:1 to 80:20.

Suitable polyether polyols (b) are mostly prepared by the base-catalyzed addition of lower alkylene oxides, especially ethylene oxide and/or propylene oxide, to di- to octafunctional, especially di- to tetrafunctional, starting substances. The content of primary hydroxy groups can be achieved by finally reacting the polyols (b) with ethylene oxide.

Further, so-called low-unsaturated polyetherols may be used as polyether polyols (b). The term "low-unsaturated polyols" as used herein means, in particular, polyether alcohols (b) having a content of unsaturated compounds of lower than 0.02 meq/g, preferably lower than 0.01 meq/g. Such polyether alcohols are mostly prepared by the addition of alkylene oxides, especially ethylene oxide, propylene oxide and mixtures thereof, to at least difunctional alcohols in the presence of so-called double-metal cyanide catalysts.

The isocyanate-reactive compounds (b) may also include chain extenders and/or cross-linking agents in this case. The chain extenders are predominantly di- or trifunctional alcohols with molecular masses of from 60 to 399, for example, ethylene glycol, propylene glycol, butanediol-1,4, pentanediol-1,5. The cross-linking agents are compounds with molecular masses of from 60 to 499 and with 3 or more active hydrogen atoms, preferably amines and more preferably alcohols, for example, glycerol, trimethylolpropane and/or pentaerythritol.

As catalysts (c), usual compounds that highly accelerate the reaction of component (a) with component (b) may be employed in this case too. For example, tertiary amines and/or organometallic compounds, especially tin compounds, may be used. Preferably, those leading to as low fogging as possible, i.e., to as low as possible a release of volatile compounds from the polyisocyanate polyaddition product, for example, tertiary amines having reactive end groups and/or higher boiling amine catalysts, are employed as the catalysts. For example, the following compounds may be employed as catalysts: triethylenediamine, aminoalkyl- and/or aminophenylimidazoles, for example, 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, tin(II) salts of organic carboxylic acids, for example, tin(II) diacetate, tin(II) dioctoate, tin(II) diethylhexoate and tin(II) dilaurate and dialkyltin(IV) salts of organic carboxylic acids, for example, dibutyltin diacetate, dibutyltin dilaurate, dibutyltin maleate and dioctyltin diacetate.

The polyurethanes employed here may be solid or cellular polyurethane. Preferably, it is cellular polyurethane, the preparation of cellular polyurethane being effected by the addition of a blowing agent. As the blowing agent (d), generally known chemically or physically active compounds may be employed. Water may be preferably employed as a chemically active blowing agent. Examples of physical blowing agents include (cyclo)aliphatic hydrocarbons, preferably those having from 4 to 8, more preferably from 4 to 6 and especially 5, carbon atoms, partially halogenated hydrocarbons or ethers, ketones or acetates. The different blowing agents may be employed singly or in any mixtures with one another. More preferably, only water is employed as a blowing agent. If physical blowing agents are used, it is preferred to employ them in an amount of <0.5% by weight, based on the weight of component (b).

The amount of blowing agents employed depends on the sought density of the foams.

The reaction is optionally performed in the presence of (e) auxiliary agents and/or additives, such as fillers, cell regulators, demolding agents, pigments, surface-active compounds and/or stabilizers against oxidative, thermal or microbial degradation or ageing.

Generally, for preparing the polyurethanes, the components of the polyurethane system, i.e., the polyisocyanates (a) and polyols (b), are reacted in such amounts that the equivalent ratio of NCO groups of (a) to the sum of reactive hydrogen atoms of (b) is preferably from 0.7 to 1.5:1, more preferably from 0.9 to 1.2:1 and especially from 1 to 1.15:1.

In a preferred embodiment, the polyurethane system is adjusted to form a closed-cell or slightly open-cell foam as a polyurethane matrix, because the spacer layer (c), especially in the case of a honeycomb cardboard, is to be sealed against environmental agents, such as water vapor, microbial attack. Preferably, the polyurethane foam employed has an open-cell property of less than 50%, more preferably less than 30%, even more preferably from 0 to 10%, especially from 0 to 5%, measured according to DIN EN ISO 7231.

The circumferential plastic material (d) preferably also consists of fiber-reinforced, especially glass-fiber reinforced, polyurethane. For this purpose, the above described components and methods of introduction may be resorted to. More preferred are S-RIM or long-fiber injection materials.

In a preferred embodiment, the thickness of the circumferential plastic material (d) is from 3 mm to 40 mm, more preferably it is the same as the thickness of the spacer layer (c).

More preferably, the material of the circumferential plastic material (d) is the same as that of the last plea of the spacer layer (c) and thus may optionally be introduced simultaneously in one operation by segment-wise admixing of glass fibers inlon the spraying head or by applying a second spraying head.

In a preferred embodiment, the circumferential plastic material (d) contains inserts or thread inserts.

"Inserts" as used herein means metal sheet inserts which may be surrounded by foam and thus enable attachment of handholds, sunshades, lamps, antennas and other parts attached to the roof module.

"Thread inserts" as used herein means thread bushings that are incorporated in the polymer matrix and thus offer possibilities for attaching handholds, sunshades, lamps, antennas and other parts attached to the roof module.

Further, it is possible to form domes that contain small inerts or thread inserts. Then, screwing can be effected therein with conventional quick-assembly screws, and the above mentioned parts may thus be attached.

In addition to the circumferential plastic material (d), such material may also be applied at points on further exposed areas of material layer (b) to provide reinforcement points. The construction of transverse or longitudinal struts from this material, which is highly compact in particular, is also possible.

The roof module is generally employed for producing vehicle body exterior parts for means of transportation, such as motor vehicles, airplanes, ships and rail vehicles, but also, for example, for producing fenders, trailing edge flaps and trunk lids.

The processes for preparing a roof module is as follows:
A) inserting an exterior skin (a) into an open mold;
B) applying the material layer (b) to the exposed surface of exterior skin (a);

C) applying the prefabricated spacer layer (c) in register to the exposed surface of material layer (b);

D) applying the circumferential plastic material (d) to the still exposed area of the surface of material layer (b); and E) closing the mold at a mold temperature within a range of from 25° C. to 140° C. for a period of from 1 min to 10 min.

The core material of the spacer layer (c) is preferably wrapped with a glass-fiber mat outside the mold and sprayed with components of the polyurethane system either in the mold or outside thereof. Of course, it is also possible to perform the process steps in part within and in part outside the mold. In particular, the four-component technique, by which spraying can be performed in a selective and tailored way, offers itself for this purpose.

More preferably, process step c) can be modified by the in situ process steps of preparing spacer layer (c) by:

C1) introducing polyurethane system components, which optionally contain glass fibers, into the mold on top of the inserted material layer (b);

C2) introducing a core layer of the spacer layer (c) into the mold on top of the introduced polyurethane system components;

C3) introducing polyurethane system components, which optionally contain glass fibers, into the mold on top of the inserted core layer of the spacer layer (c); and optionally E) closing the mold and reacting the introduced polyurethane system components to form a polyurethane before the mold is opened and circumferential plastic material (d) is introduced into the mold; and D1) again closing the mold and reacting the circumferential plastic material (d) after having been introduced.

Usually, an exterior skin (a) in inserted in the lower mold of a pair of molds or introduced in an in-mold coating process in step (A). Preferably, it is a preformed exterior skin (a), i.e., the exterior skin (a) already has the same shape as the mold. The preforming may be effected by usual preforming methods, for example, by deep drawing, especially vacuum deep drawing. Of course, the preforming is omitted when the in-mold process is employed.

In step B), the material layer (b) is preferably sprayed onto the exposed surface of exterior skin (a).

In step C1), polyurethane system components are first introduced into the mold on top of the inserted material layer (b). Like in step B), the introducing of the polyurethane system components may be effected, for example, by manual casting, by high-pressure or low-pressure with several components simultaneously or at different times in open molds. Suitable PU processing machines are commercially available (for example, from Elastogran, Isotherm, Hennecke, Krauss Maffei etc.).

When processing with polyurethane machines is performed, it is also advantageous if the supply containers are under reduced pressure during the processing.

After step (C1), a core layer of the spacer layer (c) is introduced into the mold on top of the previously introduced polyurethane system components in step (C2).

After the introduction of the core material of the spacer layer (c), in step (C3) in the process, polyurethane system components are again introduced in the mold on top of the inserted core material of the spacer layer (c), and optionally in step (D) thereafter, the mold is closed, and the reaction of the introduced polyurethane system components is performed, wherein the roof module contains two fiber-reinforced polyurethanes in which the spacer layer (c) is embedded.

The introducing of the core material of the spacer layer (c) in step (C) should be performed in such a way that the outer edge of the spacer layer (c) spares an area of material layer (b) that comprises from 2 to 70%, especially from 10 to 25%, of the area of this component.

Further, it is preferred that, in addition to the above stated dimensions, the outer edge of the spacer layer (c) within the roof module is selected not to project into the edge zone of the roof module.

After the reaction of the polyurethane system component and the opening of the mold, or alternatively before the closing of the mold, the circumferential plastic material (d) is applied to the exposed areas of material layer (b), wherein the preferably employed polyurethane components react either together with the polyurethane components of the spacer layer (c), or in a separate process step.

From a process technological point of view, it is often desirable that the exterior skin (a) extends beyond the dimensions of the roof module. In this case, the overlapping exterior skin (a) is preferably trimmed from the resulting roof module in a separate process step.

In a preferred embodiment, in steps (C1) and (C2), the introduction of the polyurethane system components is begun in the center portion of the mold (start of shot) and ended at the edge region of the mold (end of shot). This ensures a particularly advantageous displacement of the air from below the exterior skin (a) towards the edge.

The temperature of the mold is preferably from 25 to 140° C., more preferably from 40 to 120° C. When polyisocyanate polyaddition products are reacted, a temperature of the starting components of preferably from 15 to 50° C., more preferably from 25 to 40° C., is preferred. The curing of the polyisocyanate polyaddition products is preferably effected within a period of usually 1 to 10 minutes, more preferably from 2 to 4 minutes.

The manufacture of a roof module is illustrated in the following Example.

EXAMPLE

The following example refers to the layered structure shown in the figure. As the exterior skin (a), a deep-drawn multi-layer coextruded thermoplastic exterior skin (a) made of PMMA and ASA/PC was used. Subsequently, the exterior skin (a) was inserted in an open mold in the lower mold of the PUR processing equipment, the lower mold being controlled to a temperature of about 30° C.

Subsequently, a functional spraying layer (Multitec®) is applied with the full surface thereof to the exposed area of exterior skin (a) at a thickness of from 0.5 mm to 1.0 mm as material layer (b).

Subsequently, a layer coated with glass fibers on both sides thereof and sprayed with a polyurethane reaction mixture (thickness 10 mm) was inserted as the core material of the spacer layer (c).

Subsequently, the edge zone was provided with the plastic material (d), which was also glass-fiber reinforced polyurethane reaction mixture in this case, and the roof module was cured.

In Example 1, the insertion of the honeycomb cardboard was effected to form a component exterior skin (a) having an edge zone portion of about 15%.

As PUR systems, Multitec® and Baydur® STR/Baypreg® F and development systems resulting therefrom were employed. As a reinforcement material, glass fiber mats (in the spacer region) and chopped glass fibers (in the edge zone) having a glass proportion of about 40% were used. After completion of the insertion of the PUR-soaked glass fibers, the tool was closed for a period of about 240 seconds. After the reaction time had lapsed, the mold was opened, and the component produced was demolded, and the overlapping exterior skin (a) was removed.

A visual inspection of the resulting components showed that the exterior skin (a) had a class A surface finish.

Thus, a roof module for a motor vehicle is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A roof module for a motor vehicle comprising:
   an exterior skin;
   a material layer having a first major surface fully adjacent to the exterior skin to form a composite, wherein the material layer and the exterior skin have different thermal expansion coefficients, such that the composite remains essentially free of deformation upon a temperature change within a range of from −20° C. to +80° C.; and
   a spacer layer adjacent to a second major surface of the material layer, opposite the first major surface, the spacer layer comprising a core material covered by a fiber-reinforced polyurethane layer on one or both major surfaces thereof,
   wherein a circumference of the material layer on the second major surface is free from the spacer layer, thereby defining a circumferential zone, the circumferential zone being covered by a fiber-reinforced plastic material.

2. The roof module according to claim 1, characterized in that the exterior skin comprises at least one of a plastic sheet, a metal foil, or an in-mold coating.

3. The roof module according to claim 1, characterized in that the exterior skin comprises an exterior skin sheet layer coextruded with exterior skin spacer layer of polycarbonate or acrylonitrile-butadiene-styrene (ABS) and a surface layer of polymethyl methacrylate (PMMA), or a monosheet of ABS.

4. The roof module according to claim 1, characterized in that the thickness of the exterior skin is from 0.2 mm to 5 mm.

5. The roof module according to claim 4, characterized in that the thickness of the exterior skin is from 0.5 mm to 1.5 mm.

6. The roof module according to claim 1, characterized in that the material layer comprises an elastic layer of a polyurethane polymer.

7. The roof module according to claim 1, characterized in that the material layer has at least one of a modulus of elasticity of from 0.5 MPa to 50 MPa and a thickness of from 0.3 mm to 6 mm.

8. The roof module according to of claim 1, characterized in that the core material of the spacer layer comprises at least one of expanded plastic material, metal, wood, cardboard, paper, or natural or artificial fibers.

9. The roof module according to claim 8, characterized in that the core material comprises honeycomb cardboard.

10. The roof module according to claim 9, characterized in that the honeycomb cardboard have a cell size of from 4 mm to 12 mm.

11. The roof module according to claim 8, characterized in that the fiber-reinforced polyurethane layer has a thickness of from 0.01 mm to 2 mm and is soaked with a polyurethane polymer.

12. The roof module according to claim 11, characterized in that the fiber-reinforced polyurethane layer respectively has a thickness of from 0.1 mm to 1 mm.

13. The roof module according to claim 1, characterized in that the spacer layer has a thickness of from 4 mm to 30 mm.

14. The roof module according to claim 1, characterized in that the fiber-reinforced plastic material comprises glass-fiber reinforced polyurethane polymer.

15. The roof module according to claim 1, characterized in that the fiber-reinforced plastic material has a thickness within a range of from 3 mm to 40 mm.

16. The roof module according to claim 1, characterized in that the fiber-reinforced plastic material covers from 2% to 70% of the surface area of the material layer.

17. The roof module according to claim 16, characterized in that the fiber-reinforced plastic material covers from 10% to 25% of the surface area of the material layer.

18. The roof module according to claim 1, characterized in that the thickness of the spacer layer is the same as the thickness of the fiber-reinforced plastic material.

* * * * *

UNITED STATES PATENT AND TRADEMARK OFFICE
CERTIFICATE OF CORRECTION

PATENT NO. : 8,042,864 B2  
APPLICATION NO. : 12/237451  
DATED : October 25, 2011  
INVENTOR(S) : Stephan Schleiermacher et al.

Page 1 of 1

It is certified that error appears in the above-identified patent and that said Letters Patent is hereby corrected as shown below:

On the Title Page:
  Item: (73) Assignee: Bayer MaterialScience AG, Leverkusen (DE)
should read:
  -- (73) Assignees: Bayer MaterialScience AG, Leverkusen (DE); Webasto AG, Stockdorf (DE) --.

Signed and Sealed this
Fifth Day of March, 2013

Teresa Stanek Rea
*Acting Director of the United States Patent and Trademark Office*